UNITED STATES PATENT OFFICE 1,953,960

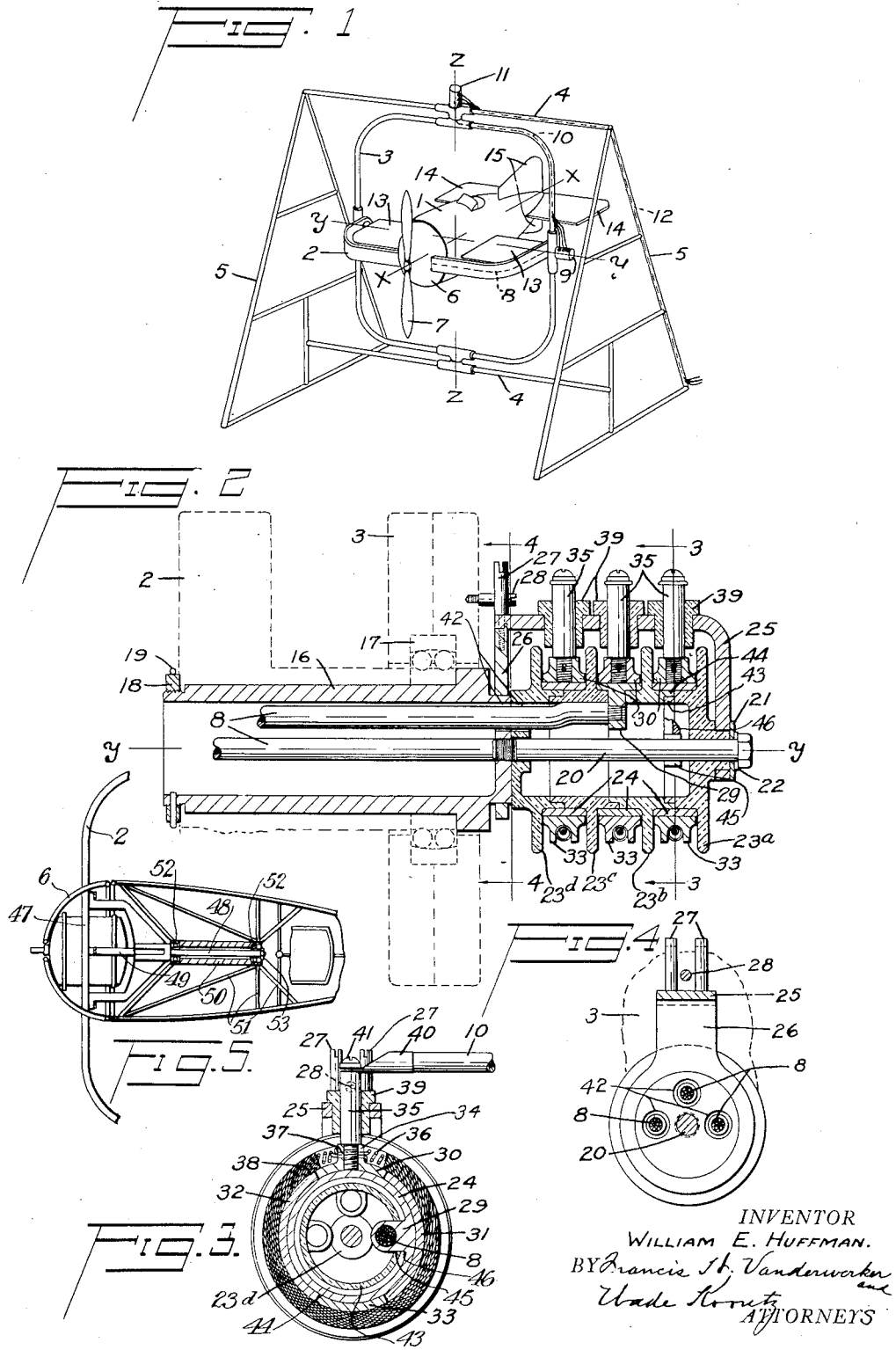

CONDUCTOR AND COLLECTOR RING

William E. Huffman, Dayton, Ohio

Application July 22, 1932, Serial No. 624,080

7 Claims. (Cl. 173—324)

(Granted under the act of March 3, 1883, as amended April 30, 1928; 370 O. G. 757)

The invention described herein may be manufactured and used by or for the Government for governmental purposes, without the payment to me of any royalty thereon.

My invention relates generally to improvements in conductor and collector rings for electric machines and is especially adapted for use on airplane pilot training devices or amusement contrivances employing gimbal rings of large diameter and light weight.

During the early development of propeller driven flight training devices of the class described, serious difficulty was experienced in furnishing uninterrupted current flow to the electric motor turning the propeller. When the fuselage of such a device was made to rotate rapidly about its lateral axis, in simulation of continuous looping, the journals of the inner ring or equivalent half ring illustrated hereinafter were deflected out of alignment with the foregoing axis of rotation by deformation of the ring structure under rotational stress. The aforementioned journal deflection necessitated installation of self-aligning bearings at point of journal attachment to the outer ring. The outer extremities of said journals were thus free to describe a wabbling motion with reference to the outer surface of said outer ring. Collector rings fixedly attached to one of said journal extremities described a like wabbling motion with reference to the outer ring surface immediately adjacent thereto. When carbon brushes positioned normal to the aforementioned axis of rotation were brought into contact with the outer surfaces of said collector rings by means of a conventional brush container fixedly attached to the aforementioned outer surface of said outer ring and the said fuselage was rotated rapidly about its lateral axis; constant forward and backward movement of the said brushes within said container was required in order to maintain unbroken electrical contact between brush and ring. During the aforementioned fuselage rotation there was further set up between the contacting surfaces of said brushes and said rings a wabbling motion which continually changed the location and area of contact between brush and ring. Under average conditions obtaining at Air Corps training centers an hour's operation of the above-described device was sufficient to burn out the aforementioned collector rings. After exhaustive experiments the present invention was conceived. Conductor rings concentrically and rotatably mounted upon the peripheries of said collector rings were substituted for the aforementioned carbon brushes and means was provided for holding said conductor rings in predetermined lateral and rotational relationship with said collector rings.

One of the objects of my invention is to provide a simple means for fixedly and concentrically attaching a plurality of collector rings to the journal of a gimbal ring or equivalent in predetermined lateral relationship to one another.

Another object of my invention is to provide means for holding conductor rings concentrically and rotatably mounted upon the peripheries of said collector rings in predetermined lateral and rotational relationship to the aforementioned collector rings.

A further object of my invention is to provide means for assuring uninterrupted physical contact between the adjacent surfaces of each conductor and collector ring without the introduction of excessive friction, mechanical wear or electrical fusion between the aforementioned rings.

It is still a further object of my invention that the foregoing means also permit ready removal and replacement of one or more of the aforementioned conductor rings without disturbance of the remaining conductor ring or rings.

With the foregoing and other objects in view, which will appear as the description proceeds, the invention consists of certain new and novel improvements in conductor and collector ring assemblies which will be hereinafter more fully illustrated and described in the accompanying drawing and more particularly pointed out in the appended claims.

Referring to the drawing, in which numerals of like character designate similar parts throughout the several views:

Fig. 1 is a schematic view of two sets of conductor and collector ring assemblies installed upon a flight trainer;

Fig. 2 is a vertical cross-section of one of the sets of improved conductor and collector ring assemblies;

Fig. 3 is a cross-section taken on the line 3—3 of Fig. 2;

Fig. 4 is a cross-section taken on the line 4—4 of Fig. 2, and

Fig. 5 is a partial plan view in section showing the method of fuselage attachment to the gimbal ring supporting the same.

In Fig. 1, the forward end of a fuselage 1 is rotatably attached to the central portion of a half gimbal ring or U-shaped member 2 in the manner shown in Fig. 5. The fuselage 1 may thus be freely rotated about its longitudinal axis x—x. The outer ends of the member 2 are pivotally secured to the horizontal axis of a gimbal ring member 3, thus permitting free rotation of the fuselage 1 about its lateral axis y—y. The top and bottom of the ring 3 are pivotally secured to the central portions of two members 4, thus permitting free rotation of the fuselage 1 about its normal or vertical axis z—z. The outer extremities of the members 4 are fixedly attached to the tops and bottoms of two vertical members 5. There is also fixedly attached to the central portion of the member 2 an electric motor, not shown but covered by a cowling 6. A propeller 7 is mounted upon the forward end of said electric motor. Electric cables 8 are connected at their inner extremities to said electric motor and at their outer extremities to the collector rings of the conductor and collector ring assembly 9. Electric cables 10 connect the conductor rings of the ring assembly 9 with the collector rings of the second conductor and collector ring assembly 11. Electric cables 12 connect the conductor rings of the ring assembly 11 with a source of power, not shown. As long as electric current is transmitted through the cables 12, uninterrupted rotation of the propeller 7 will occur, regardless of the movement which the fuselage 1 may be made to execute in response to appropriate manipulations of the lateral control surfaces 13, horizontal control surfaces 14, or vertical control surfaces 15.

In Fig. 2 the detailed parts of the conductor and collector ring assembly 9 are shown in cross-section. A journal 16 is fixedly secured to an extremity of the member 2 and to the inner race of a self-aligning ball bearing 17 by means of a lock nut 18 and a lock wire 19. The outer race of said bearing 17 is fixedly secured to that portion of the ring 3 through which the axis y—y passes. There are fixedly secured to the right-hand extremity of the journal 16, by means of a screw 20, a washer 21 of insulating material and a lock washer 22, collars 23a through 23d of insulating material and collector rings 24. The collars 23a through 23d are provided with telescoping portions 43 and 44 for effecting alignment of the same about y—y as a common axis. Cutouts 45 and 46 are provided for inwardly extending terminals 29 of the collector rings 24, the terminals 29 locking the collars 23a and 23b, 23b and 23c and 23c and 23d against individual rotation with respect to the axis Y—Y. A portion of the collar 23a has been broken away, immediately above the inwardly extending terminal 29, to better show the cutout 46 of the collar 23b. Further cut-outs are provided in the outer extremity of the journal 16 and the collar 23d adjacent thereto for passage of the electric cables 8 into the hollow interior of the journal 16. Prior to final installation, the cables 8 are fixedly secured to the terminals of the collector rings 24 by conventional soldering. A bracket 25 is pivotally mounted upon the outer extremity of the assembled collars 23a through 23d. A bracket 26 is pivotally mounted upon the outer extremity of the journal 16. The aforementioned brackets are assembled into a single unit by means of two spaced screws 27, the heads of which extend outwardly to form stops.

The outwardly extending terminals 35 of conductor ring segments 30 are encased in plugs 39 of insulating material to prevent said terminals 35 from contacting with the bracket 25 during rotation of journal 16.

Fig. 3 illustrates the manner in which segments 30, 31, 32 and 33 and the terminals 35 are assembled into self-contained units by means of readily detachable springs 36. The terminal 35 is first screwed fast to the boss 34 of the segment 30 and the spring 36 slipped within a flexible metal conduit 38. The segments 30, 31, 32 and 33 are then grouped upon the periphery of a collector ring 24 and the assembled spring 36 and conduit 38 are placed within the U-shaped portions of said segments, after which the whole is secured together by insertion of the two ends of the spring 36 through the holes 37 in the boss 34 and terminal 35, said spring ends being bent over to prevent accidental withdrawal from the holes 37. After encasement of the terminal 35 in the plug 39, the terminal 40 of the electric cable 10 is fixedly secured to the terminal 35 by means of the screw 41. One of the three electric cables 8, an inwardly extending terminal 29 of a collector ring 24 and a cut-out 46 are shown in cross section, while the remaining two cables 8, a cut-out 45 and two terminals 29 are shown in profile.

Fig. 4 shows an end profile of the journal 16, with the bracket 26 and a broken-away portion of the ring 3 shown in plan view. The outward portion of the bracket 25 is shown fixedly attached to the bracket 26 by means of the spaced screws 27. A third screw 28, the head of which extends outwardly to form a pin, is fixedly attached to the ring 3 in such a manner that clockwise or counter-clockwise rotation of the assembled brackets 25 and 26 about the journal 16 is limited to the space provided between the pin portion of the screw 28 and the stop portions of screws 27. Cut-outs 42 are provided in the outer extremity of the journal 16 to permit entry of the cables 8 into the hollow interior of said journal 16. Similar cut-outs 42 are also provided in the collar 23d adjacent the journal 16.

Fig. 5 shows the manner in which the fuselage 1 is rotatably secured to the member 2. The inner ends of the member 2 terminate in an annular member 47. A journal 48 is fixedly attached to the member 47 by means of four plates 49. A bearing retainer 50 is fixedly attached to the structural members of the fuselage 1, by means of brace tubes 51. Attachment of the fuselage 1 to the journal 48 is accomplished by installation of bearings 52 and lock nut 53.

I claim:

1. The combination with an electric machine having two relatively rotating members of a unitary assembly of collars and collector rings operatively associated with one of said members, a plurality of conductor rings composed of two or more segments each adapted to be rotatably mounted upon said collector rings, means for securing the segments of each conductor ring to a collector ring and means rotatably mounted upon said first mentioned member for holding said conductor rings against rotation with respect to said other member of said electric machine in such a manner that concentric alignment of said collector and said conductor ring segments will be obtained irrespective of wabbling motion between said relatively rotating members.

2. The combination with an electric machine having two relatively rotating members of a unitary assembly of collars and collector rings operatively associated with one of said members, a plurality of conductor rings composed of two or more segments each adapted to be rotatably mounted upon said collector rings, yieldable means for securing the segments of each conductor ring in assembled and freely rotatable engagement with a collector ring and means rotatably mounted upon said first mentioned member for restricting rotation of said conductor rings with respect to said other rotating member in such a manner that concentric alignment of said collector and said conductor rings will be obtained irrespective of wabbling motion between said relatively rotating members.

3. The combination with an electric machine having two relatively rotating members of a unitary assembly of collars and collector rings operatively associated with a journal of one of said members, a plurality of conductor rings composed of two or more segments each adapted to be rotatably mounted upon said collector rings, spring means for securing the segments of each conductor ring in assembled and freely rotatable engagement with a collector ring, a bracket concentrically supported by said journal and freely rotatable relative thereto, said bracket uniting said conductor rings to prevent movement of said rings relative to one another, and lost motion connection means for avoiding misalignment of said collector and said conductor rings during wabbling motion between said relatively rotating members.

4. The combination with an electric machine having two relatively rotating members of a unitary assembly of collars and collector rings operatively associated with a journal of one of said members, a plurality of conductor rings composed of two or more segments each adapted to be rotatably mounted upon said collector rings, spring means for securing the segments of each conductor ring in assembled and freely rotatable engagement with a collector ring, a bracket concentrically and rotatably mounted upon the aforementioned unitary assembly and journal, said bracket uniting said conductor rings into a second unitary assembly, insulating means between said bracket and said conductor rings, and lost motion connection means for avoiding misalignment of said collector and said conductor rings during wabbling motion between said relatively rotating members.

5. A contactor of the class described, comprising a support of insulating material, a plurality of collector rings concentrically and fixedly mounted thereon, a plurality of conductor rings composed of two or more segments each freely rotatably mounted upon said collector rings, and means for yieldably securing the individual segments of each conductor ring in assembled engagement with a collector ring.

6. A contactor of the class described, comprising a support of insulating material, a plurality of collector rings concentrically and fixedly mounted thereon, a plurality of conductor rings composed of two or more segments each freely rotatably mounted upon said collector rings and spring means for holding the individual segments of each conductor ring in assembled and freely rotatable engagement with a collector ring.

7. A contactor of the class described, comprising a support of insulating material, a plurality of collector rings concentrically and fixedly mounted thereon, a plurality of conductor rings composed of two or more segments each rotatably mounted upon said collector rings, and spring means for holding said conductor ring segments in assembled and freely rotatable engagement with said collector rings, said spring means including a coiled spring incased within a flexible metal conduit, the assembled spring and conduit completely encircling the segments of each conduit ring and providing an electrical connection therebetween.

WILLIAM E. HUFFMAN.